United States Patent [19]

Farnham et al.

[11] Patent Number: 4,728,706

[45] Date of Patent: Mar. 1, 1988

[54] TITANIUM, ZIRCONIUM- AND HAFNIUM CONTAINING INITIATORS IN THE POLYMERIZATION OF ACRYLIC MONOMERS TO "LIVING" POLYMERS

[75] Inventors: William B. Farnham, Wilmington, Del.; Walter R. Hertler, Kennett Square, Pa.

[73] Assignee: E. I. Du Pont De Nemours and Company, Wilmington, Del.

[21] Appl. No.: 901,769

[22] Filed: Aug. 29, 1986

[51] Int. Cl.$^4$ ................................................ C08F 4/06
[52] U.S. Cl. ..................................... 526/172; 526/170; 526/241; 260/665 R; 556/52
[58] Field of Search .................... 526/172, 170, 241; 260/665 R; 556/52

[56] References Cited

U.S. PATENT DOCUMENTS

| | | | |
|---|---|---|---|
| 3,037,004 | 5/1962 | Simone et al. | 260/80 |
| 3,114,737 | 12/1963 | Herman et al. | 526/92 |
| 3,324,092 | 6/1967 | Noarmann et al. | 526/172 |
| 3,370,041 | 2/1968 | Kornicka et al. | 526/90 |
| 3,394,156 | 7/1968 | Kornicker et al. | 260/429.5 |
| 3,681,317 | 8/1972 | Pioli et al. | 260/94.9 B |
| 3,738,944 | 6/1973 | Candlin et al. | 252/431 R |
| 3,740,384 | 6/1973 | Ballard et al. | 260/94.9 C |
| 3,773,742 | 11/1973 | Kruse | 260/94.9 B |
| 3,846,389 | 11/1974 | Furukawa et al. | 260/83.5 |
| 3,919,180 | 11/1975 | Furukawa et al. | 260/80.7 |
| 3,950,269 | 4/1976 | Setterquist | 252/430 |
| 3,971,767 | 7/1976 | Setterquist | 526/65 |
| 4,414,372 | 11/1983 | Farnham et al. | 526/190 |
| 4,417,034 | 11/1983 | Webster | 526/190 |
| 4,508,880 | 4/1985 | Webster | 526/190 |
| 4,524,196 | 6/1985 | Farnham et al. | 526/190 |
| 4,581,428 | 4/1986 | Farnham et al. | 526/190 |
| 4,588,795 | 5/1986 | Dicker et al. | 526/192 |
| 4,605,716 | 8/1986 | Hertler | 526/190 |

FOREIGN PATENT DOCUMENTS

| | | |
|---|---|---|
| 0017937 | 10/1980 | European Pat. Off. . |
| 56-136865 | 3/1980 | Japan . |
| 61026607 | 7/1984 | Japan . |
| 1314828 | 4/1973 | United Kingdom . |

OTHER PUBLICATIONS

Webster et al., J. Am. Chem. Soc., 105, 5706 (1983), "Group Transfer Polymerization".

Reetz, "Selective Reactions of Organotitanium Reagents", Pure and Appl. Chem., 57, No. 12, Dec. 1985, pp. 1781-1788.

*Primary Examiner*—Joseph L. Schofer
*Assistant Examiner*—Peter F. Kulkosky

[57] ABSTRACT

Process for preparing "living" polymer, the process comprising contacting one or more acrylic monomers under polymerizing conditions with a polymerization-initiating amount of a tetra-coordinate organotitanium, organozirconium or organo-hafnium polymerization initiatior, and "living" polymers produced thereby.

24 Claims, No Drawings

TITANIUM, ZIRCONIUM- AND HAFNIUM CONTAINING INITIATORS IN THE POLYMERIZATION OF ACRYLIC MONOMERS TO "LIVING" POLYMERS

FIELD OF INVENTION

This invention relates to processes for polymerizing acrylic monomers to "living" polymers by means of titanium- (Ti), zirconium- (Zr) and hafnium- (Hf) containing initiators, and to the "living" polymers produced by such processes.

BACKGROUND

Ester and ketone enolates of Ti, Zr and Hf are either known compounds or are obvious from the art. Moreover, the use of Ziegler-type coordination catalysts for the polymerization or copolymerization of non-polar 1-olefins, such as ethylene or propylene, is well known in the art. Such catalysts usually are based on transition metal salts, e.g. titanium, zirconium or vanadium halides, which have been converted into reduced valence states by reaction with a variety of alkylating or arylating substances, usually simple organometallic compounds of a metal of Groups I, II or III of the Periodic Chart of the Elements. More recent variants of Ziegler-type catalysts employed in olefin polymerization include those described in U.S. Pat. Nos. 3,681,317, 3,740,384, 3,738,944 and British Pat. No. 1,314,828 wherein tetrabenzyl-transition metal compounds, e.g. tetrabenzyl zirconium, are complexed with anionic ligands, e.g. halide, and/or neutral ligands, e.g. pyridine. U.S. Pat. No. 3,773,742 discloses tetraneopentyl titanium as an ingredient in an olefin polymerization catalyst, either alone or in combination with an organoaluminum compound or supported on silica gel. U.S. Pat. Nos. 3,971,767 and 35 3,950,269 disclose olefin polymerization catalysts comprising a suspension of alumina having chemically bonded onto its surfaces a transition metal hydrocarbyl hydride aluminate prepared by reacting a hydrocarbon solution of a tetra(hydrocarbyl) transition metal $(R—CH_2)_4M$, wherein R is non-beta H-containing aryl, aralkyl or tertiary alkyl, and M is Ti, Zr or Hf, with a suspension of a selected hydrated alumina. Polar monomers such as acrylic monomers may be included as minor comonomers.

U.S. Pat. Nos. 3,394,156 and 3,370,041 disclose the use of compounds of Ti or Zr as catalysts for the polymerization of acrylic monomers, including methyl methacrylate (MMA) and acrylonitrile. Included are compounds of the formula

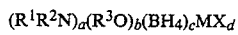

wherein $R^{1-3}$ are hydrocarbyl radicals, M includes Ti, Zr and Hf, X is an acid anion, which includes halogen, acetylacetonate and acetate, and a, b, c and d are zero or integers such that $a+b+c+d=4$.

U.S. Pat. Nos. 3,919,180 and 3,846,389 disclose the production of alternating copolymers of "donor" and "acceptor" monomers comprising not less than three monomers, in the presence of a catalyst prepared from (a) at least one compound of a transition metal selected from Groups IV and V of the Periodic Chart and (b) an aluminum-containing component consisting of one or more aluminum hydrocarbyl halides, at least one of (a) and (b) being complexed with a basic organic compound which is an organic nitrile, $\alpha,\beta$-unsaturated carboxylic acid ester, benzoic acid ester, selected amine or thiophene. Donor monomers are non-polar unsaturated hydrocarbons; acceptor monomers include acrylic monomers.

U.S. Pat. No. 3,114,737 discloses the aqueous dispersion polymerization of vinyl or acrylic monomers in the presence of: (a) a compound of the formula $R_nMR_m'$ wherein R is cyclopentadienyl, methylcyclopentadienyl, indenyl or fluorenyl, M is Zr or Ti, R' is alkoxy, cycloalkoxy, acyloxy or halogen, n is 1 or 2, m is 1-3 and m+n is 3 or 4; and (b) a co-catalyst comprising a halogenated acetic acid.

U.S. Pat. No. 3,037,004 discloses the liquid phase polymerization of acrylic acids, acrylates, alkyl styrenes and acrylonitrile with a catalyst comprising (a) the Zr or Ti compound of U.S. Pat. No. 3,114,737, provided that when m is 3, at least one R' must be halogen or acyloxy, and (b) a ketone or aldehyde whose carbonyl group is not in an aromatic ring.

European Patent Application Publication No. 0 017 937 and Japanese Patent Application No. J56 136,865 disclose polymerizable medical or dental bonding compositions comprising a (meth)acrylate or (meth)acrylamide monomer and a selected Ti or Si compound; the titanium compound is of the formula $$R_6O—Ti(OR_3)(OR_4)(OR_5)$$

wherein: $R_3$ is $C_{1-20}$ aliphatic hydrocarbyl optionally with one or two OH groups, $C_{1-3}$ alkoxy or di(hydroxyC$_{2-3}$alkyl)amino; and $R_{4-6}$ are hydrocarbyl optionally with one or two OH groups; or $R_7CO—$ wherein $R_7$ is olefinic hydrocarbyl $CH_2=CR_8—$ wherein $R_8$ is H or $CH_3$, $C_{1-20}$ saturated hydrocarbyl optionally with one or two OH groups, $C_{1-3}$ alkoxy or $—COR'_8$ wherein $R'_8$ is $C_{1-3}$ alkyl. For polymerization the composition, preferably in two parts, also contains a catalyst and an activator, which are exemplified by N,N-bis(2-hydroxyethyl)-4-methylaniline and benzoyl peroxide, respectively.

Japanese Patent Application No. J61 026,606 discloses the polymerization of ethylene and an acrylate in the presence of a Lewis acid and a catalyst comprised of compounds of the formula

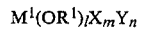     (a)

and

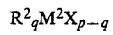     (b)

wherein: $M^1$ is V, Zr or Hf; $R^1$ and $R^2$ are $C_{1-20}$ alkyl, cycloalkyl, aryl or aralkyl; X is halogen; Y is oxygen, cyclopentadienyl or acetylacetonyl; $M^2$ is Li, Na, K, Zn, Cd, Al, B or Ga; l, m and n are 0-5; p is the valence of $M^2$; and q is $>0$ and equal to or less than p.

U.S. Pat. Nos. 4,414,372; 4,417,034; 4,508,880; 4,524,196; 4,581,428; 4,588,795; 4,605,716; and 4,622,372, and commonly assigned U.S. patent application Ser. Nos. 660,588 filed Oct. 18, 1984; 771,684–771,686 filed Sept. 3, 1985; 786,101 filed Oct. 15, 1985; and 872,610 filed June 10, 1986, referred to hereinafter as "the aforesaid patents and patent applications", disclose processes for polymerizing a polar acrylic or maleimide monomer to a "living" polymer in the presence of an initiator, which is a tetracoordinate organosilicon, organotin or organogermanium compound having at least one initiating site, and a co-catalyst which is a source of bifluoride, fluoride, cyanide or azide ions or a suitable Lewis acid, Lewis base or selected oxyanion. Such polymerization processes have become known in the art as Group Transfer Polymerization (Webster et al. J. Am. Chem. Soc. 105, 5706 (1983)).

M. T. Reetz, "Selective Reactions of Organotitanium Reagents", Pure and Appl. Chem., 57, No. 12, December, 1985, pp. 1781–1788, discloses that titanium ester enolates in the absence of a catalyst cause rapid oligomerization to produce living polymers in quantitative yield. An unbalanced chemical equation indicates reaction of 1-tris(isopropoxy)titanoxy-1-methoxy-2-methyl-1-propene with methyl methacrylate to form a 1:1 adduct which then forms polymer. No process details are provided and there is no indication of reaction conditions, such as temperature, solvents or reactant ratios necessary for polymerization.

It is an object of the present invention to provide processes for preparing "living" polymers by polymerizing one or more acrylic monomers in the presence of an organotitanium, organozirconium or organohafnium polymerization initiator. A further object is to provide "living" polymers containing initiating sites comprising the aforesaid metals. Another object is to provide such "living" polymers as intermediates to useful linear or branched acrylic polymers, including block copolymers, optionally containing functional substituents for further chemical processing. These and other objects will become apparent from the description which follows.

DETAILED DISCUSSION OF THE INVENTION

This invention provides a process for preparing a "living" polymer, the process comprising contacting under polymerizing conditions at least one acrylic monomer with a tetracoordinate organotitanium, organozirconium or organohafnium polymerization initiator having at least one initiating site.

Preferred monomers are α-methylene (exounsaturated) lactones and lactams and the acrylic monomers of the formula $CH_2=C(Y)X$ wherein:

X is —CN, —CH=CHC(O)X' or —C(O)X';

Y is —H, —CH$_3$, —CN or —CO$_2$R, provided, however, when X is —CH=CHC(O)X', Y is —H or —CH$_3$;

X' is —OSi(R$^1$)$_3$, —R, —OR or —NR'R";

each R$^1$, independently, is a hydrocarbyl radical which is an aliphatic, alicyclic, aromatic or mixed aliphatic-aromatic radical containing up to 20 carbon atoms or —H, provided that at least one R$^1$ group is not —H;

R is:
  (a) a hydrocarbyl radical which is an aliphatic, alicyclic, aromatic or mixed aliphatic-aromatic radical containing up to 20 carbon atoms;
  (b) a polymeric radical containing at least 20 carbon atoms;
  (c) a radical of (a) or (b) containing one or more ether oxygen atoms within aliphatic segments thereof;
  (d) a radical of (a), (b) or (c) containing one or more functional substituents that are unreactive under polymerizing conditions; or
  (e) a radical of (a), (b), (c) or (d) containing one or more reactive substituents of the formula —Z'—(O)C—C(Y$^1$)=CH$_2$ wherein Y$^1$ is —H or —CH$_3$ and Z' is O or NR' wherein R' is as defined below; and each of R' and R" is independently selected from C$_{1-4}$ alkyl.

Monomers that are suitable for use in the practice of this invention are, in general, known compounds and include, but are not limited to, the following: methyl, ethyl and butyl methacrylates; lauryl methacrylate; sorbyl methacrylate; butyl acrylate; acrylonitrile; methacrylonitrile; 2-ethylhexyl methacrylate; 2-(dimethylamino)ethyl methacrylate; 2-(dimethylamino)ethyl acrylate; 3,3-dimethoxypropyl acrylate; 3-methacryloxypropyl acrylate; 2-acetoxyethyl methacrylate; p-tolyl methacrylate; 2,2,3,3,4,4,4-heptafluorobutyl methacrylate; methylene malononitrile; N,N-dimethyl methacrylamide; 2-methacryloxyethyl acrylate and linoleate; propyl vinyl ketone; ethyl 2-chloroacrylate; glycidyl methacrylate; 3-methoxypropyl methacrylate; 2[(1-propenyl)oxy]ethyl methacrylate and acrylate; 2-(trimethylsiloxy)ethyl methacrylate; allyl methacrylate; unsaturated esters of polyols, particularly such esters of α-methylenecarboxylic acids, for example, ethylene glycol dimethacrylate, 1,3-propanediol dimethacrylate, 1,2,4-butanetriol trimethacrylate, 1,4-benzenediol dimethacrylate, pentaerythritol tetramethacrylate, 1,5-pentanediol dimethacrylate, the bis-methacrylates of polyethylene glycols of molecular weight 200–4000, and unsaturated N-alkylated amides, such as methylene bis(N-methylmethacrylamide), ethylene bis(N-methylmethacrylamide), 1,6-hexamethylene bis(N-methylacrylamide), bis(γ-N-methylmethacrylamidopropoxy)ethane-β-N-methylmethacrylamideoethyl methacrylate; 3,3,4,4,5,5,6,6,6-nonafluorohexyl methacrylate; and mixtures thereof. Preferred monomers include the methacrylates, particularly methyl methacrylate; glycidyl methacrylate; 2-(trimethylsiloxy)ethyl methacrylate; 2-acetoxyethyl methacrylate; 2-(dimethylamino)ethyl methacrylate; N-phenyl-N-methylacrylamide; triethylene glycol dimethacrylate; 1,1,1-trimethylolpropane trimethacrylate; and hexamethylenediol dimethacrylate. Methyl methacrylate is most preferred.

As indicated above in the definition of R in the formula for the monomer, substituents that are unreactive under polymerizing conditions include those having oxygen-, nitrogen-, or silicon-containing groups which are devoid of reactive hydrogen atoms. Groups such as OSi(R$^1$)$_3$ and CONH$_2$ are nonreactive under such conditions and, therefore, can be tolerated. On the other hand, groups such as CO$_2$H and OH are reactive under polymerizing conditions. In order for monomers containing such groups on the R substituent to be useful in the invention process, the groups may be chemically protected, i.e. deactivated. Monomers containing such deactivated groups are useful in the preparation of polymers which, upon treatment to remove the protective group, have functional sites along the polymer chain. Monomers which contain sufficiently sterically hindered amine and alcohol groups that remain inert under reaction conditions may be used directly without deactivation. The functional sites can impart special properties to the polymer products, including curability and photosensitivity.

The definition of R in the monomer formula also includes substituents which are reactive under polymerizing conditions and of the formula $CH_2=C(Y^1)C(O)Z'$ wherein Y$^1$ is —H or —CH$_3$ and Z' is O or NR'. These reactive substituents provide additional centers for initiation of polymerization, leading to the growth of polymeric branches. The reactive substituents are derived from (meth)acrylates or (meth)acrylamides which are themselves operable monomers in the present invention. These substituents can react with initiators of the invention to provide new initiating sites from which polymeric branches can grow in the presence of monomer(s).

Preferred initiators are selected from the tetracoordinate organotitanium, organozirconium and organohafnium compounds of the formulas $(R^4)_{3-a}MZ_{a+1}$ and $O[M(R^4)_2Z^1]_2$ wherein:

each $R^4$, independently, is —CH$_3$, —F, —Cl, —Br, —I, —OR$^5$, —NHR$^5$, —NR$_2^5$, cyclopentadienyl, C$_{6-20}$ aryl or C$_{7-21}$ arylmethyl, or any of the last three groups containing substituents that are inert under polymerizing conditions, and/or two $R^4$ groups taken together are $$( CH_2)_n \quad \text{or} \quad ( CH_2)_m$$
$$\underset{|}{Z'} \qquad \underset{|}{Z'} \quad \underset{|}{Z'}$$

wherein
each Z', independently, is O or NR', R' is C$_{1-4}$ alkyl, and each of m and n is 2 to 4;

each $R^5$, independently, is hydrocarbyl which is aliphatic, alicyclic, aromatic or mixed aliphatic-aromatic containing up to 20 carbon atoms, or said hydrocarbyl radical containing one or more functional substitutents that are unreactive under polymerizing conditions; preferably, $R^5$ is C$_{1-4}$ alkyl or substituted C$_{1-4}$ alkyl;

Z is an activating substituent selected from the group consisting of $$\underset{\underset{R^3}{|}}{\overset{\overset{R^2}{|}}{-C}}-CN, \quad \underset{\underset{R^3}{|}}{\overset{\overset{R^2}{|}}{-C}}-\overset{\overset{O}{\|}}{CX''}, \quad \overset{\overset{O}{\|}}{C}\underset{\underset{(CH_2)_m}{|}}{\overset{\overset{}{}}{\underset{Z'}{-}}} \quad \overset{\overset{R^2}{|}}{\underset{\underset{(CH_2)_n}{|}}{-C-,}} \quad \overset{\overset{O}{\|}}{C}\underset{\underset{}{}}{\overset{\overset{}{}}{-}}\overset{\overset{R^2}{|}}{\underset{\underset{}{}}{C-}}$$

$$-N=C=\overset{\overset{R^2}{|}}{C}-R^3, \quad -OC=\underset{\underset{R^3}{|}}{\overset{\overset{R^2}{|}}{C}}-R^2, \quad -OC\underset{\underset{(CH_2)_m}{}}{=\!=\!=}CR^2,$$

$$-OC\underset{\underset{(CH_2)_n}{}}{=\!=\!=}CR^2$$

and mixtures thereof;
X" is —OSi(R$^1$)$_3$, —OR$^6$ or —NR'R";
Z' is O or NR';
m is 2, 3 or 4;
n is 3, 4 or 5;
Z$^1$ is $$-OC=\underset{\underset{R^3}{|}}{\overset{\overset{R^2}{|}}{C}}-R^2;$$

$R^6$ is
(a) a hydrocarbyl radical which is an aliphatic, alicyclic aromatic or mixed aliphatic-aromatic radical containing up to 20 carbon atoms;
(b) a polymeric radical containing at least 20 carbon atoms;

(c) a radical of (a) or (b) containing one or more ether oxygen atoms within aliphatic segments thereof;
(d) a radical of (a), (b) or (c) containing one or more functional substituents that are unreactive under polymerizing conditions; or
(e) a radical of (a), (b), (c) or (d) containing one or more initiating sites; and each $R^1$, independently, is a hydrocarbyl radical which is aliphatic, alicyclic, aromatic or mixed aliphatic-aromatic radical containing up to 20 carbon atoms or —H, provided that at least one $R^1$ group is not —H;

each of $R^2$ and $R^3$ is independently selected from —H and hydrocarbyl, defined as for $R^6$ above, subparagraphs (a) to (e);

each of R' and R" is independently selected from C$_{1-4}$ alkyl;
M is Ti, Zr or Hf, preferably Ti or Zr; and
a is 0, 1 or 2, preferably 0, provided, however, when Z is —OC(X")=C($R^2$)($R^3$), one $R^4$ group and X", taken together, can be Z'(CH$_2$)$_2$Z'— wherein Z' is defined as above.

Preferably, Z is —OC(X")=C($R^2$)($R^3$), X" is —OR$^6$,
$R^2$ and $R^3$ are C$_{1-10}$ alkyl, more preferably methyl,
and $R^6$ is C$_{1-10}$ alkyl, more preferably methyl.

By initiating site is meant a group comprising a titanium, zirconium or hafnium-containing moiety, such as $(R^4)_{3-a}M-$ or $-(R^4)_2MOM(R^4)_2-$, wherein all symbols are as defined above.

The process of the invention is carried out at about −100° C. to about 150° C., preferably 0° C. to 50° C., more preferably at ambient temperature. A solvent is desirable but not essential, and mixtures of solvents may be employed. In general, useful solvents are aprotic ethers, nitriles, hydrocarbons, chlorinated hydrocarbons, carbonates, tertiary amides or amines.

Suitable solvents are aprotic liquids in which the monomer and initiator are sufficiently soluble for reaction to occur; that is, the materials are dissolved at the concentrations employed. Suitable solvents include ethyl acetate, propionitrile, toluene, xylene, bromobenzene, dimethoxyethane, diethoxyethane, diethylether tetramethylene sulfone, N,N-dimethylformamide, N-N-dimethylacetamide, N-methylpyrrolidone, anisole, 2-butoxyethoxytrimethylsilane, cellosolve acetate, crown ethers such as 18-crown-6, and tetrahydrofuran, the latter being a preferred solvent. Acetonitrile also may be employed as a solvent, but only in a minor amount in admixture with another solvent.

The monomers used in the process of the invention are generally liquids and can be polymerized without a solvent, although a solvent is beneficial in controlling temperature during exothermic polymerization. When a solvent is used, the monomer may be dissolved or dispersed therein at concentrations of at least 1 wt. %, preferably at least 10 wt. %.

The initiator is employed at a concentration such that the monomer/initiator molar ratio is at least 4, preferably at least 10.

Optimum operating temperature is markedly influenced by the chemical structure of the initiator, and principally in the substituent $R^4$. When the $R^4$ groups are —OR$^5$, —Z'—CH$_2$—$_m$ wherein Z' is O, —NR$^5$ and/or —NR$_2^5$, highest conversion to "living" polymer is obtained at temperatures below about −20° C., preferably below about −70° C. When at least two $R^4$ groups are the bulkier non-polar cyclopentadienyl, aryl or arylmethyl groups, operation at temperatures above 0° C., preferably room temperature or higher, are desirable to overcome rate-reducing steric effects. Because of their higher activity, initiators wherein $R^4$ is an O- or N-containing group, e.g. isopropoxy (Example 4) or diethylamino (Example 1), are most effective when kept in solution at temperatures below about $-20°$ C., preferably below about $-70°$ C.; initiators wherein at least two $R^4$ groups are larger, e.g. cyclopentadienyl (Examples 2, 3, 6–8), remain effective after isolation and storage at room temperature until used.

A catalyst is not required in the practice of this invention, and catalysts which are essential in the practice of the inventions of the aforesaid patents and patent applications have been found to be without effect herein.

The initiators used in the process of the invention are either known compounds or can be prepared by known methods from known starting materials. For example, butyl lithium in the presence of a secondary amine, such as diisopropylamine, in an appropriate solvent, such as tetrahydrofuran, can be reacted with a compound of the formula $R^2R^3CHC(O)X''$ wherein $R^2$, $R^3$ and $X''$ are defined as above, and the reaction product can then be reacted with an appropriate Ti, Zr or Hf compound, such as that of the formula $(R^4)_{3-a}M-Cl$ or $O[M(R^4)_2-Cl]_2$ wherein $R^4$, M and a are defined as above, to provide the initiator. Alternatively, a silane such as $R^2R^3C=C(OX'')OSi(R^1)_3$ wherein $R^2$, $R^3$, $X''$ and $R^1$ are defined as above can be used instead of $R^2R^3CHC(O)X''$.

Useful initiators of the invention include those wherein the activating substituent Z or $Z^1$ also contains one or more reactive initiating substituents, resulting in branched polymers. Such initiators can be prepared in situ by reacting a monomeric compound containing at least one reactive substituent with a "simple" initiator $(R^1)_3MZ$, or precursor thereof, containing at least one initiating site.

It is to be understood that the useful initiators include nitriles, esters, amides, and ketones, and their corresponding ketene imine and enol forms, all of which are active in the polymerization process of this invention. Moreover, the initiators wherein the activating moiety Z contains $R^6$, $R^2$, and/or $R^3$ can also have, like the monomer, one or more functional substituents attached to an aforesaid R group, provided such substituents do not interfere with polymerization. Functional substitutents which are useful include, but are not limited to, $-OSi(R^1)_3$, $-CO_2R^6$, $H_3\ OC(O)R^6$, $-OC(O)R^6$, $-NR'R''$, $-C(O)NR'R''$, $-CN$, $-OCH(R^6)\ OR^6$, $-OC(R^6)(R^6)OR^6$,

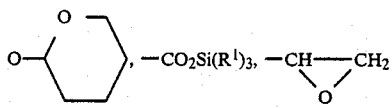

$-C(CH_3)=CH_2$, $-SR^6$, $-P(O)(NR'R'')_2$, $-P(O)[OSi(R^1)_3]_2$ and $-P(O)(OR^1)_2$. Such substituents, either directly or after treatment, for example, hydrolysis, provide functional sites along or at the end of polymer chains suitable for cross-linking, chain extension, chain branching, or for modifying properties such as water sorption, UV absorption, and the like. In the practice of this invention, as described below, an initiator moiety forms one end of a polymer chain or branch and hence said polymers can be terminally or centrally functionalized by appropriate initiator selection and polymer treatment.

The monomer/initiator molar ratio fairly accurately determines the number average molecular weight $\overline{M}_n$ of the "living" polymer product which has a relatively low polydispersity (D). D is defined as the ratio of weight to number average molecular weight $\overline{M}_w/\overline{M}_n$, as determined by gel permeation chromatography (GPC).

By "living" polymer is meant a polymer that contains at least one initiating site and is therefore capable of polymerizing further in the presence of monomer(s). The polymers produced by the invention process are "living" polymers consisting essentially of at least four repeat units of at least one acrylic monomer and having at least one initiating site that comprises Ti, Zr or Hf and that is capable of polymerizing further in the presence of acrylic monomer(s).

Preferred "living" polymers of the invention are of the formula $(R^4)_{3-a}M[Q\overline{P}Z'']_{a+1}$, $R_p[Z^3\overline{P}QM(R^4)_3]_p$ or $O[M(R^4)_2$ wherein:

Rp is a hydrocarbyl radical which is aliphatic, alicyclic, aromatic or mixed aliphatic-aromatic containing up to 20 carbon atoms, or a polymeric radical containing at least 20 carbon atoms, of valence p, optionally containing one or more ether oxygen atoms, keto groups and/or functional substituents that are unreactive under polymerizing conditions;

p is an integer and is at least 1;

$Z^3$ is a diradical selected from the group consisting of

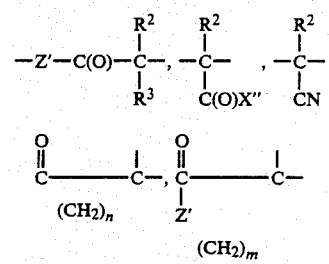

and mixtures thereof;

Z'' is selected from the group consisting of

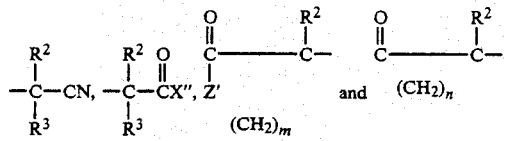

$\overline{P}$ is a divalent polymeric radical consisting essentially of at least four repeat units, preferably at least ten repeat units, of at least one acrylic monomer, preferably as defined above by formula;

Q is a divalent radical consisting essentially of one or both tautomeric forms of an acrylic unit; and the remaining symbols are defined as above.

"Living" polymer obtained by means of the process of the invention can be contacted (quenched) with an active hydrogen source, such as moisture or an alcohol, for example, methanol, to convert it to a "nonliving" polymer by deactivating the initiating site.

The "living" polymer of the invention can be a homopolymer or copolymer, depending on the monomer or monomers selected for use in the process of the invention, and it can be linear or branched. Moreover, the "living" polymer can be used to prepare block copolymers and/or, by reaction of functional substituents, cross-linked or graft polymers. Suitable functional substituents are inert under polymerizing conditions, as described above, and can be present in the monomer repeat units and/or in the initiator residues (which are derived from the activating substituent or diradical of the initiator) contained in the polymeric product. Functional substituents may also be introduced by chemically deactivating (capping) the initiating sites in the "living" polymer with a functionalized capping agent. Thus, chain-extended, block, star-branched and/or cross-linked polymers can be prepared, depending on the number of initiating sites and/or functional substituents present in the "living" polymer, or depending on the number of capping sites and/or functional substituents present in the capping agent.

Capping (deactivating) agents that are useful in the process of the invention include optionally functionalized aliphatic-aromatic compounds containing one or more capping functions, such as —CHO, acetals, cyclic acetals, —Cl, —Br, —NCO, —$TiCl_3$ and —C(O)X wherein X is —Cl or —Br. The capping reaction is normally carried out in an organic liquid wherein both polymer and capping agent are soluble; frequently, the polymerization solvent is suitable.

In the following examples, parts and percentages are by weight and temperatures are in degrees Celsius unless otherwise specified. Molecular weights were determined by gel permeation chromatography (GPC). Unless otherwise specified, the "living" polymer products were quenched by exposure to moist air before molecular weights were determined.

Structural formulas of the initiators employed in the examples are as follows:

| Example | Initiator |
|---|---|
| 1, 5 | $(CH_3)_2C=C(OCH_3)OZr[N(C_2H_5)_2]_3$ |
| 2, 3, 6–8 | $(CH_3)_2C=C(OCH_3)OM(Cp)_2Cl$ |
| 4 | $(CH_3)_2C=C(OCH_3)OTi(OiPr)_3$ |

M is Zr(Ex 2,7); Ti(Ex 3,8); Hf(Ex 6);
Cp is cyclopentadienyl;
iPr is isopropyl.

EXAMPLE 1

Polymerization of Methyl Methacrylate with 1-Tris(diethylamino)zirconoxy-1-methoxy-2-methyl-1-propene at Ambient Temperature A. A 0.1M stock solution of chlorotris(diethylamino)zirconium in tetrahydrofuran (THF) was prepared in a dry box by the addition of 1.14 g (3 mmol) of tetrakis(diethylamino)zirconium to 233 mg (1 mmol) of zirconium tetrachloride. After standing for 1 h, the mixture was diluted to 40 mL with tetrahydrofuran, and the resulting 0.1M stock solution was stored at $-23°$ in a refrigerated dry box.

To a solution of 0.14 mL (1 mmol) of diisopropylamine in 10 mL of THF at 0° was added 1 mmol of 1.6M butyl lithium in hexane. After 30 min, the solution was cooled to $-78°$ and treated with 0.115 mL (1 mmol) of methyl isobutyrate. After 30 min, 10 ml of 0.1M chlorotris(diethylamino)zirconium in THF was added and the solution was allowed to warm to room temperature.

B. To the solution prepared in Part A was added 10 g (10.8 mL, 100 mmol) of methyl methacrylate (MMA). As the MMA was added, the temperature rose from 19.8° to 32.4°. When about half of the MMA had been added, the temperature began to fall. After all of the MMA had been added, a sample was removed for analysis. $^1$H-NMR showed 53% conversion of MMA to poly(methyl methacrylate) (PMMA) with $\overline{M}_n$ 3350, $\overline{M}_w$ 8010, D=2.39 (theory for 53% conversion, $\overline{M}_n$=5300). Precipitation of the initially gummy PMMA with 1:1 aqueous methanol gave 2.2 g of PMMA. Gel permeation chromatographic analysis showed $\overline{M}_n$ 3780, $\overline{M}_w$ 12,200, D=3.24. $^1$H-NMR analysis for triad-composition showed 6% isotactic, 33% heterotactic, and 61% syndiotactic with Bernoullian statistics.

EXAMPLE 2

Polymerization of MMA with 1-Chlorobis(cyclopentadienyl)zirconoxy-1-methoxy-2-methyl-1-propene A. To a solution of 6.59 g (7.6 mL, 0.0379 mol) of [(1-methoxy-2-methyl-1-propenyl)oxy]trimethylsilane in 80 mL of anhydrous THF at 0° was added 23.7 mL (0.0379 mol) of 1.6M butyl lithium in hexane. The solution was stirred 1 h at room temperature, and then cooled to $-70°$ and treated with 11.08 g of dicyclopentadienyl zirconium dichloride. The resulting mixture was stirred for 3 h at room temperature and filtered under argon. The filtrate was evaporated under reduced pressure, and the residue was treated with anhydrous ether and filtered under argon. The filtrate was evaporated and 12 g of 1-chlorobis(cyclopentadienyl)zirconoxy-1-methoxy-2-methyl-1-propene was recovered. Anal: Calc'd for $C_{15}H_{19}ZrClO_2$: C 50.32, H 5.35, Cl 9.91; Found: C 51.49, H 5.91, Cl 9.24. The $^1$H-NMR spectrum shows resonances at 6.4 ppm (m, cyclopentadienyl), 3.46 (s, methoxy), 1.56, 1.63 (2s, C-Me) consistent with the title structure.

B. To a stirred solution of 5 mL of 1M 1-chlorobis(cyclopentadienyl)zirconoxy-1-methoxy-2- methyl-1-propene/THF prepared in Part A, in 15 mL of THF under argon at $-74°$ was added 10 g (10.8 mL, 100 mmol) of MMA (purified by passage over a column of neutral alumina under argon). A sample of the solution (2.5 mL) was removed and found to contain no polymer after addition to methanol. The reaction mixture was then allowed to warm to room temperature and stirred for 18 h at ambient temperature. Addition to methanol gave 2.0 g of PMMA, $\overline{M}_n$ 44,000, $\overline{M}_w$ 106,000, D=2.39. NMR showed about twice as much syndiotactic as heterotactic triads in the PMMA.

EXAMPLE 3

Polymerization of MMA with 1-Chlorobis(cyclopentadienyl)titanoxy-1-methoxy-2-methyl-1-propene Using a procedure similar to that of Example 2, dicyclopentadienyltitanium dichloride was converted to 1-chlorobis(cyclopentadienyl)titanoxy-1-methoxy-2-methyl-1-propene.

To a solution of 5 mL of 0.89M 1-chlorobis(cyclopentadienyl)titanoxy-1-methoxy-2-methyl-1propene/THF in 15 mL of THF was added 10 g (10.8 mL, 100 mmol) of MMA. No exotherm was observed, and the solution was stirred 18 h at ambient temperature. Evaporation gave 3.5 g of PMMA, $\overline{M}_n$ 4000, $\overline{M}_w$ 17,000, D=4.30.

EXAMPLE 4

Polymerization of MMA with 1-Tris(isopropoxy)titanoxy-1-methoxy-2-methyl-1-propene at 20° and at −70°

A. To a solution of 0.14 mL (1 mmol) of diisopropylamine in 15 mL of anhydrous THF at 0° was added 1 mmol of 1.6M n-butyl lithium in hexane. After 30 min at 0°, the solution was cooled to −78° and 0.115 mL (1 mmol) of methyl isobutyrate was added. After 15 min at −78°, 5 mL of 0.2M tris(isopropoxy)titanium chloride in THF (prepared by the reaction of one equivalent of titanium tetrachloride with three equivalents of titanium isopropoxide) was added. After 15 min at −78°, 15 mL of THF was added, and the solution was allowed to warm to 20° and promptly used in accordance with Part B which follows.

B. To the solution from Part A was added 10 g (10.8 mL, 100 mmol) of MMA (purified by passage over a column of neutral alumina under an argon atmosphere). The temperature rose from 20° to 24.5°. Analysis of a small sample of the solution by NMR showed that about 35% of the MMA had been converted to PMMA. Precipitation with hexane gave 1 g of PMMA, $\bar{M}_n$ 3200, $\bar{M}_w$ 5900, D=1.84 (theory for 35% conversion, $\bar{M}_n$=3600). $^1$H-NMR analysis of the PMMA shows 5.9% isotactic, 36.5% heterotactic, 57.6% syndiotactic with Bernoullian statistics.

C. (1) Separately, the title initiator was prepared in THF solution by a method similar to that used in Part A. However, the initiator was isolated by warming the solution to room temperature, stirring for 30 min, filtering under argon and evaporating the filtrate in vacuo. The residue was then re-extracted in ether, the solution was re-filtered and the filtrate was evaporated to a viscous orange liquid. The initiator was allowed to stand overnight at room temperature and then dissolved in 20 mL of anhydrous methylene chloride. To this solution was added 10.8 mL (100 mmol) of purified MMA. A weak exotherm (temperature rise of 3.4°) was observed during monomer addition. An aliquot of the product solution was added to hexane; no precipitation was observed.

(2) In a subsequent experiment, the initiator, prepared as described in Paragraph (1), was promptly dissolved in methylene chloride and MMA was added as described above. A weak exotherm was observed during monomer addition as before; polymerization was allowed to proceed overnight at room temperature. An aliquot of the product solution was added to hexane and a precipitate was obtained from which PMMA was isolated (8% yield): $\bar{M}_n$ 22,9000; $\bar{M}_w$ 106,000; D=4.6. GPC analysis of the hexane mother liquor showed the presence of MMA oligomers having a molecular weight maximum of about 1,000.

D. To a solution of 1-tris(isopropoxy)titanoxy-1-methoxy-2-methyl-1-propene prepared as in Part A but not warmed above −78° was added a solution of 10 g of MMA in 20 mL of THF while maintaining the temperature of the reaction mixture at −70° to −72°. After each 25% of the monomer solution was added, small samples were removed from the reaction mixture, quenched with methanol, and used for GPC analysis of molecular weight. NMR analysis of the final sample showed 92% conversion of MMA to PMMA. The reaction mixture was quenched with 1 mL of methanol before warming to room temperature. The polymer was precipitated with hexane and reprecipitated from THF with 1:1 methanol-water to give 8 g of PMMA. NMR analysis of the polymer showed 0.6% isotactic, 17% heterotactic, and 82.4% syndiotactic triads with Bernoullian statistics. The molecular weight data of the four aliquots is as follows:

| Sample # | $\bar{M}_n$ | $\bar{M}_w$ | D | $\bar{M}_n$ Theory |
|---|---|---|---|---|
| 1 | 3090 | 5180 | 1.67 | 2600 |
| 2 | 5870 | 10400 | 1.78 | 5100 |
| 3 | 8140 | 17100 | 2.10 | 7600 |
| 4 | 13400 | 25400 | 1.89 | 10100 |

The regular increase in polymer molecular weight with monomer addition is evidence that the polymer is "living".

EXAMPLE 5

Polymerization of MMA with 1-Tris(diethylamino)zirconoxy-1-methoxy-2-methyl-1-propene at 25° and at −70°

Essentially the same procedures used in Example 4 were followed using 10 mL of 0.1M tris(diethylamino)zirconium chloride instead of 5 mL of 0.2M tris(isopropoxy)titanium chloride. Polymerization of MMA at 25° gave an exotherm to 34° with 43% conversion of MMA to PMMA with $\bar{M}_n$ 8910, $\bar{M}_w$ 23,300, D=2.62 (theory for 43% conversion, 4400). NMR showed that the PMMA was 5.0% isotactic, 36.2% heterotactic, and 58.5% syndiotactic with Bernoullian statistics. Polymerization of MMA at −70° to −72° gave 96% conversion to PMMA which was 1% isotactic, 20.4% heterotactic, and 78.6% syndiotactic with Bernoullian statistics. The polymer molecular weights determined from the four aliquots removed from the low temperature polymerization are as follows:

| Sample # | $\bar{M}_n$ | $\bar{M}_w$ | D | $\bar{M}_n$ Theory |
|---|---|---|---|---|
| 1 | 3160 | 4970 | 1.57 | 2600 |
| 2 | 5770 | 9040 | 1.57 | 5100 |
| 3 | 7840 | 17300 | 2.21 | 7600 |
| 4 | 11800 | 70700 | 5.98 | 10100 |

The regular increase in molecular weight with addition of monomer is evidence that the polymer is "living".

EXAMPLE 6

Polymerization of MMA with 1-Chlorobis(cyclopentadienyl)hafnoxy-1-methoxy-2-methyl-1-propene A. To a solution of 0.14 mL (1 mmol) of diisopropylamine in 15 mL of THF at 0° was added 1 mmol of 1.6M n-butyl lithium in hexane. After 30 min at 0°, the solution was cooled to −78° and treated with 0.115 mL (1 mmol) of methyl isobutyrate. After 15 min at −78°, 380 mg (1 mmol) of dicyclopentadienylhafnium dichloride was added, and the mixture was stirred at −78° for 15 min.

B. The solution from Part A at −78° was treated with 15 mL of THF, warmed to room temperature, and then treated with 10 g (10.8 mL, 100 mmol) of MMA and heated at reflux for 3 h. After addition of 1 mL of methanol, precipitation with hexane followed by precipitation from THF with aqueous methanol gave 1.8 g of PMMA. GPC analysis showed a bimodal composition with 82% of the polymer having $\bar{M}_n$ 4070, $\bar{M}_w$ 7210, $D=1.77$, and 18% having $\overline{M}_n$ 119,000, $\overline{M}_w$ 242,000, $D=2.03$. NMR analysis of the polymer showed 6.3% isotactic, 39.4% heterotactic, and 54.3% syndiotactic.

EXAMPLE 7

Polymerization of MMA with 1-chlorobis(cyclopentadienyl)zirconoxy-1-methoxy-2-methyl-1-propene A. A solution of [(1-methoxy-2-methyl-1propenyl)oxy]trimethylsilane (MTS) (0.87 g, 5.0 mmol) in THF (20 mL) at $-5°$ was treated with butyl lithium (5.0 mmol) in hexane. The resulting solution was stirred for 4 min at 0°, cooled to $-60°$, and treated with a solution of dicyclopentadienylzirconium dichloride (1.46 g, 5.0 mmol) in THF (20 mL). The stirred mixture was allowed to warm slowly to 25°. Volatiles were removed under vacuum. The residue was transferred to a dry box and treated with petroleum ether and a small volume of THF. The yellow solid initiator thus produced was filtered (0.84 g). A further 0.45 g of initiator was obtained from the filtrate by cooling (yield about 70%). $^1$H-NMR (THF-d8) : 6.35 (s, C$_5$H$_5$), 3.33 (s, OCH$_3$), 1.50 and 1.45 (s, CH$_3$).

B. The zirconium enolate prepared in Part A (300 mg, 0.84 mmol) in THF (20 mL) was treated with MMA (3.0 mL) and heated at 35° for 4.5 h. Removal of solvent provided 1.60 g of polymer. GPC analysis showed $\overline{M}_n$ 1700, $\overline{M}_w$ 12,000, $D=7.3$. Control (reactions showed that dicyclopentadienylzirconium dichloride does not promote polymerization of MMA under similar conditions.

EXAMPLE 8

Polymerization of MMA with 1-Chlorobis(cyclopentadienyl)titanoxy-1-methoxy-2-methyl-1-propene A. A solution of MTS (1.74 g, 10 mmol) in THF (20 mL) at $-10°$ was treated with butyl lithium (10 mmol), and the mixture was stirred for 4 min at 0°. Dicyclopentadienyltitanium dichloride (2.49 g, 10 mmol) was added, and the mixture was allowed to warm to room temperature.

B. A 5.0 mL aliquot of the reaction mixture from Part A was added to a mixture of THF (20 mL) and MMA (5 mL). The mixture was heated to reflux for 0.5 h. Evaporation provided 2.93 g of PMMA. GPC: $\overline{M}_n$ 1200, $\overline{M}_w$ 3700, $D=3.14$.

We claim:

1. Process for preparing "living" polymer, the process comprising contacting one ore more acrylic monomers under polymerizing conditions with a polymerization-initiating amount of a tetracoordinate organotitanium, organozirconium or organohafnium polymerization initiator of the formula $(R^4)_{3-a}MZ_{a+1}$ or $O[M(R^4)_2Z^1]_2$ wherein:

each $R^4$, independently, is —CH$_3$, —F, —Cl, —Br, —I, —OR$^5$, —NHR$^5$, —NR$_2^5$, cyclopentadienyl, C$_{6-20}$ aryl or C$_{7-21}$ arylmethyl, or any of the last three groups containing substituents that are inert under polymerizing conditions;
two $R^4$ groups taken together are

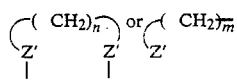

wherein each $Z'$, independently, is O or NR', R', is C$_{1-4}$ alkyl, and each of m and n is 2 to 4;
each $R^5$, independently, is hydrocarbyl which is aliphatic, alicyclic, aromatic or mixed aliphatic-aromatic containing up to 20 carbon atoms, or said hydrocarbyl radical containing one or more functional substituents that are unreactive under polymerizing conditions;
Z is an activating substituent selected from the group consisting of

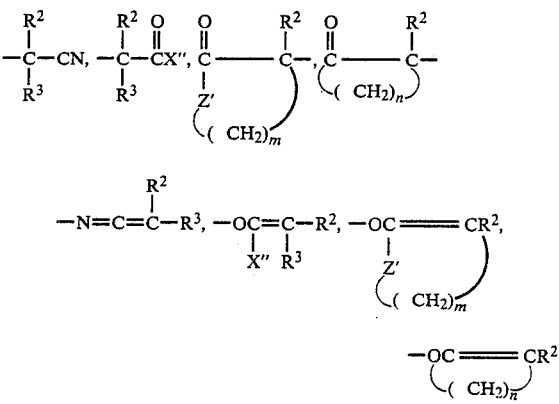

and mixtures thereof;
X" is —OS(R$^1$)$_3$, —OR$^6$ or —NR'R";
Z' is O or NR';
m is 2, 3 or 4;
n is 3, 4 or 5;
Z$^1$ is

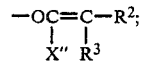

$R^6$ is (a) a hydrocarbyl radical which is an aliphatic, alicyclic, aromatic or mixed aliphatic-aromatic radical containing up to 20 carbon atoms;
(b) a polymeric radical containing at least 20 carbon atoms;
(c) a radical of (a) or (b) containing one or more ether oxygen atoms within aliphatic segments thereof;
(d) a radical of (a), (b) or (c) containing one or more functional substituents that are unreactive under polymerizing conditions; or
(e) a radical of (a), (b), (c) or (d) containing one or more initiating sites; and each $R^1$, independently, is a hydrocarbyl radical which is aliphatic, alicyclic, aromatic or mixed aliphatic-aromatic radical containing up to 20 carbon atoms or —H, provided that at least one $R^1$ groups is not —H;
each of $R^2$ and $R^3$ is independently selected from —H and hydrocarbyl, defined as for $R^6$ above, subparagraphs (a) to (e);
each of R' and R" is independently selected from C$_{1-4}$ alkyl;
M is Ti, Zr or Hf; and
a is 0, 1 or 2, provided, however, when Z is —OC(X")=C(R$^2$)(R$^3$), one $R^4$ group and X", taken together, can be $$-Z'(CH_2)_2Z'-$$

wherein Z' is defined as above.

2. Process of claim 1 wherein the acrylic monomer is of the formula $CH_2=C(Y)X$ wherein:
   X is $-CN$, $-CH=CHC(O)X'$ or $-C(O)X'$;
   Y is $-H$, $-CH_3$, $-CN$ or $-CO_2R$, provided, however, when X is $-CH=CHC(O)X'$, Y is $-H$ or $-CH_3$;
   X' is $-OSi(R^1)_3$, $-R$, $-OR$ or $-NR'R''$;
   each $R^1$, independently, is a hydrocarbyl radical which is an aliphatic, alicyclic, aromatic or mixed aliphatic-aromatic radical containing up to 20 carbon atoms or $-H$, provided that at least one $R^1$ group is not $-H$;
   R is:
   (a) a hydrocarbyl radical which is an aliphatic, alicyclic, aromatic or mixed aliphatic-aromatic radical containing up to 20 carbon atoms;
   (b) a polymeric radical containing at least 20 carbon atoms;
   (c) a radical of (a) or (b) containing one or more ether oxygen atoms within aliphatic segments thereof;
   (d) a radical of (a), (b) or (c) containing one or more functional substituents that are unreactive under polymerizing conditions; or
   (e) a radical of (a), (b), (c) or (d) containing one or more reactive substituents of the formula $$-Z'(O)C-C(Y^1)=CH_2$$

wherein
   Y is $-H$ or $-CH_3$ and Z' is O or NR' wherein R' is as defined below; and
   each of R' and R'' is independently selected from $C_{1-4}$ alkyl.

3. Process of claim 1 wherein $R^5$ is alkyl or substituted alkyl.

4. Process of claim 1 wherein Z is $OC(X'')=C(R^2)(R^3)$; X'' is $OR^6$; $R^2$, $R^3$ and $R^6$ are $C_{1-10}$ alkyl; M is Ti or Zr; and a is 0, 1 or 2.

5. Process of claim 4 wherein $R^3$ and $R^6$ are methyl and a is 0.

6. Process of claim 1 wherein each $R^4$ is $N(C_{1-4}$ alkyl$)_2$.

7. Process of claim 6 wherein each $R^4$ is $N(C_2H_5)_2$.

8. Process of claim 1 wherein at least two $R^4$ groups are present and are cyclopentadienyl, $C_{6-20}$ aryl, $C_{7-21}$ arylmethyl, or any of said groups containing substituents that are inert under polymerizing conditions.

9. Process of claim 8 wherein at least two $R^4$ groups are cyclopentadienyl.

10. Process of claim 9 wherein the initiator is $(R^4)_3MZ$, two of $R^4$ are cyclopentadienyl, and one $R^4$ is Cl.

11. Process of claim 1 wherein each $R^4$ is $OR^5$ and $R^5$ is $C_{1-4}$ alkyl.

12. Process of claim 11 wherein each $R^4$ is isopropoxy.

13. "Living" polymer consisting essentially of at least four repeat units of at least one acrylic monomer and having at least one initiating site that comprises Ti, Zr or Hf and that is capable of polymerizing further in the presence of acrylic monomer(s), said polymer being of the formula $R_p[Z^3\bar{P}QM(R^4)_3]_p$, $O[M(R^4)_2Q\bar{P}Z'']_2$ or $(R^4)_{3-a}M[Q\bar{P}Z'']_{a+1}$ wherein:

Rp is a hydrocarbyl radical which is aliphatic, alicyclic, aromatic or mixed aliphatic-aromatic containing up to 20 carbon atoms, or a polymeric radical containing at least 20 carbon atoms, of valence p, optionally containing one or more ether oxygen atoms, keto groups and/or functional substitutents that are unreactive under polymerizing conditions;
p is an integer and is at least 1;
$z^3$ is a diradical selected from the group consisting of $$-Z'-C(O)-\overset{R^2}{\underset{R^3}{\overset{|}{\underset{|}{C}}}}-, \quad -\overset{R^2}{\underset{C(O)X''}{\overset{|}{\underset{|}{C}}}}-, \quad -\overset{R^2}{\underset{CN}{\overset{|}{\underset{|}{C}}}}-$$

and mixtures thereof;
Z'' is selected from the group consisting of $$-\overset{R^2}{\underset{R^3}{\overset{|}{\underset{|}{C}}}}-CN, \quad -\overset{R^2}{\underset{R^3}{\overset{|}{\underset{|}{C}}}}-\overset{O}{\overset{||}{C}}-CX'', \text{ and}$$

$\bar{P}$ is a divalent polymeric radical consisting essentially of at least four repeat units of at least one acrylic monomer;
Q is a divalent radical consisting essentially of one or both tautomeric forms of an acrylic repeat unit;
each $R^4$, independently, is $-CH_3$, $-F$, $-Cl$, $-Br$, $-I$, $-OR^5$, $-NHR^5$, $-NR_2^5$, cyclopentadienyl, $C_{6-20}$ aryl or $C_{7-21}$ arylmethyl, or any of the last threee groups containing substitutents that are inert under polymerizing conditons, and/or two $R^4$ groups taken together are wherein each Z', independently, is O or NR', R' is $C_{1-4}$ alkyl, and each of m and n is 2 to 4;
M is Ti, Zr or Hf;
a is 0, 1 or 2;
X'' is $-OSi(R^1)_3$, $-OR^6$ or $-NR'R''$;
$R^6$ is
   (a) a hydrocarbyl radical which is an aliphatic, alicyclic, aromatic or mixed aliphatic-aromatic radical containing up to 20 carbon atoms;
   (b) a polymeric radical containing at least 20 carbon atoms;
   (c) a radical of (a) or (b) containing one or more ether oxygen atoms within aliphatic segments thereof;
   (d) a radical of (a), (b) or (c) containing one or more functional substituents that are unreactive under polymerizing conditions; or (e) a radical of (a), (b), (c) or (d) containing one or more initiating sites;

each $R^5$, independently, is hydrocarbyl which is aliphatic, alicyclic, aromatic or mixed aliphatic-aromatic containing up to 20 carbon atoms, or said hydrocarbyl radical containing one or more functional substituents that are unreative under polymerizing conditions;

each of $R^2$ and $R^3$ is independently selected from —H and hydrocarbyl, defined as for $R^6$ above, subparagraphs (a) to (e);

each $R^1$, independently, is a hydrocarbyl radical which is aliphatic, alicyclic, aromatic or mixed aliphatic-aromatic radical containing up to 20 carbon atoms or —H, provided that at least one $R^1$ group is not —H; and each of R' and R" is independently selected from $C_{1-4}$ alkyl.

14. "Living" polymer of claim 13 wherein there are at least ten repeat units.

15. "Living" polymer of claim 13 wherein the monomer is methyl methacrylate.

16. "Living" polymer of claim 13 wherein M is Ti.

17. "Living" polymer of claim 13 wherein M is Zr.

18. "Living" polymer of claim 13 wherein each $R^4$ is $N(C_{1-4}$ alkyl$)_2$.

19. "Living" polymer of claim 18 wherein each $R^4$ is $N(C_2H_5)_2$.

20. "Living" polymer of claim 13 of the formula $(R^4)_3MQ\bar{P}Z''$ wherein two of $R^4$ are cyclopentadienyl and one $R^4$ is Cl.

21. "Living" polymer of claim 13 wherein each $R^4$ is isopropoxy.

22. "Living" polymer of claim 13 wherein at least two $R^4$ are cyclopentadienyl, $C_{6-20}$ aryl, $C_{7-21}$ arylmethyl, or any of said groups containing substiuents that are inert under polymerizing conditions.

23. "Living" polymer of claim 22 wherein at least two $R^4$ groups are cyclopentadienyl.

24. "Living" polymer of claim 13 wherein $R^4$ is $OR^5$ and $R^5$ is $C_{1-4}$ alkyl.

* * * * *

UNITED STATES PATENT AND TRADEMARK OFFICE
CERTIFICATE OF CORRECTION

PATENT NO. : 4,728,706

DATED : March 1, 1988

INVENTOR(S) : William B. Farnham   Walter R. Hertler

It is certified that error appears in the above-identified patent and that said Letters Patent is hereby corrected as shown below:

Column 14, Line 30 "-OS($R^1$)$_3$" should read -- -OSi($R^1$)$_3$ --

Column 14, Line 59 "groups" should read -- group --

Column 15, Line 35 "Y" should read -- $Y^1$ --

Column 16, Line 42 "threee" should read -- three --

Signed and Sealed this

Second Day of August, 1988

Attest:

DONALD J. QUIGG

Attesting Officer

Commissioner of Patents and Trademarks